United States Patent
Kim et al.

(10) Patent No.: US 8,170,584 B2
(45) Date of Patent: May 1, 2012

(54) PROVIDING AN ACTIONABLE EVENT IN AN INTERCEPTED TEXT MESSAGE FOR A MOBILE DEVICE BASED ON CUSTOMIZED USER INFORMATION

(75) Inventors: Ben Kim, Sunnyvale, CA (US); Irvin Henderson, Palo Alto, CA (US); Tong Zhu, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 466 days.

(21) Appl. No.: 11/422,534

(22) Filed: Jun. 6, 2006

(65) Prior Publication Data

US 2007/0282954 A1    Dec. 6, 2007

(51) Int. Cl.
*H04W 24/00*    (2009.01)
(52) U.S. Cl. ..................... 455/456.3; 455/433
(58) Field of Classification Search .................. 455/433, 455/456.3
See application file for complete search history.

(56) References Cited

U.S. PATENT DOCUMENTS

| | | | |
|---|---|---|---|
| 5,493,692 A | 2/1996 | Theimer et al. | |
| 5,758,088 A | 5/1998 | Bezaire et al. | |
| 5,915,220 A * | 6/1999 | Chelliah | ............... 455/435.2 |
| 6,021,433 A | 2/2000 | Payne et al. | |
| 6,128,735 A | 10/2000 | Goldstein et al. | |
| 6,167,426 A | 12/2000 | Payne et al. | |
| 6,349,337 B1 | 2/2002 | Parsons, Jr. et al. | |
| 6,442,593 B1 | 8/2002 | Wang et al. | |
| 6,611,812 B2 | 8/2003 | Hurtado et al. | |
| 6,735,614 B1 | 5/2004 | Payne et al. | |
| 6,789,108 B1 | 9/2004 | McMillan | |
| 6,834,195 B2 | 12/2004 | Brandenberg et al. | |
| 6,889,062 B2 | 5/2005 | Hamynen et al. | |
| 6,947,451 B1 | 9/2005 | Dommety et al. | |
| 6,947,738 B2 | 9/2005 | Skog et al. | |
| 7,000,023 B2 | 2/2006 | Chiba | |
| 7,054,905 B1 | 5/2006 | Hanna | |
| 7,159,210 B2 | 1/2007 | Griffin et al. | |

(Continued)

FOREIGN PATENT DOCUMENTS

EP    1259042 A2    11/2002

(Continued)

OTHER PUBLICATIONS

Notification of Transmittal of the International Search Report and The Written Opinion of the International Searching Authority, or the Declaration, PCT/US2007/068796, mailed Oct. 19, 2007.

(Continued)

*Primary Examiner* — Nick Corsaro
*Assistant Examiner* — Amanuel Lebassi
(74) *Attorney, Agent, or Firm* — Frommer Lawrence & Haug LLP; Jamie L. Wiegand

(57) ABSTRACT

A network device, method, and apparatus are directed towards intercepting a message, such as an SMS, EMS, MMS message, email message, or the like, from a source device directed towards a mobile device. The intercepted message's contents are analyzed. In addition, a mobile user profile is determined from characteristics of the mobile device and tracked usage of a mobile user of the mobile device. An actionable event may then be inserted into the intercepted message based, in part, on the analysis and the mobile user profile. The modified message is then provided to the mobile device, where the mobile user may select the actionable event to receive non-requested content.

23 Claims, 6 Drawing Sheets

U.S. PATENT DOCUMENTS

| | | | |
|---|---|---|---|
| 7,403,973 | B2 | 7/2008 | Wilsher et al. |
| 7,454,164 | B2 * | 11/2008 | Goss ............................ 455/3.01 |
| 7,472,162 | B2 | 12/2008 | Thompson et al. |
| 7,870,293 | B2 | 1/2011 | Tso |
| 2001/0011366 | A1 | 8/2001 | Beck et al. |
| 2001/0054087 | A1 | 12/2001 | Flom et al. |
| 2002/0019243 | A1 * | 2/2002 | Zhang et al. ................. 455/466 |
| 2002/0078209 | A1 | 6/2002 | Peng |
| 2002/0137507 | A1 * | 9/2002 | Winkler ....................... 455/426 |
| 2002/0143856 | A1 | 10/2002 | Sastri et al. |
| 2002/0143871 | A1 | 10/2002 | Meyer et al. |
| 2003/0084165 | A1 | 5/2003 | Kjellberg et al. |
| 2003/0093311 | A1 | 5/2003 | Knowlson |
| 2003/0093459 | A1 | 5/2003 | Dowling et al. |
| 2003/0125023 | A1 | 7/2003 | Fishler |
| 2003/0163359 | A1 | 8/2003 | Kanesaka |
| 2003/0163815 | A1 | 8/2003 | Begeja et al. |
| 2003/0182388 | A1 | 9/2003 | Alexander et al. |
| 2003/0185195 | A1 | 10/2003 | Dowling et al. |
| 2003/0185357 | A1 | 10/2003 | Kaghazian |
| 2003/0187990 | A1 | 10/2003 | Knauerhase et al. |
| 2003/0191689 | A1 | 10/2003 | Bosarge et al. |
| 2003/0220125 | A1 | 11/2003 | Ito et al. |
| 2003/0236917 | A1 | 12/2003 | Gibbs et al. |
| 2004/0038670 | A1 | 2/2004 | Ando et al. |
| 2004/0117459 | A1 | 6/2004 | Fry |
| 2004/0128347 | A1 | 7/2004 | Mason et al. |
| 2004/0131081 | A1 | 7/2004 | Bhatia et al. |
| 2004/0203863 | A1 | 10/2004 | Huomo |
| 2004/0205492 | A1 | 10/2004 | Newsome |
| 2005/0021616 | A1 | 1/2005 | Rajahalme et al. |
| 2005/0054446 | A1 | 3/2005 | Kammler et al. |
| 2005/0130685 | A1 | 6/2005 | Jenkin |
| 2005/0188056 | A1 | 8/2005 | Kangas et al. |
| 2005/0278425 | A1 | 12/2005 | Wilsher et al. |
| 2006/0020596 | A1 | 1/2006 | Liu et al. |
| 2006/0031523 | A1 | 2/2006 | Morris |
| 2006/0041589 | A1 | 2/2006 | Helfman et al. |
| 2006/0069671 | A1 | 3/2006 | Conley et al. |
| 2006/0069687 | A1 | 3/2006 | Cui et al. |
| 2006/0069749 | A1 * | 3/2006 | Herz et al. ..................... 709/219 |
| 2006/0085731 | A1 | 4/2006 | Cui et al. |
| 2006/0116146 | A1 | 6/2006 | Herrod et al. |
| 2006/0168095 | A1 | 7/2006 | Sharma et al. |
| 2006/0209867 | A1 | 9/2006 | Schmidt et al. |
| 2006/0224846 | A1 | 10/2006 | Amarendran et al. |
| 2006/0282738 | A1 | 12/2006 | Sohn et al. |
| 2007/0088801 | A1 * | 4/2007 | Levkovitz et al. ............. 709/217 |

FOREIGN PATENT DOCUMENTS

| | | |
|---|---|---|
| JP | 2001331361 A | 11/2001 |
| JP | 2002-133288 A | 5/2002 |
| JP | 2004082354 A | 3/2004 |
| JP | 2004102553 A | 4/2004 |
| KR | 20040020098 | 9/2005 |
| WO | 00-73902 A1 | 12/2000 |
| WO | WO-01/78319 | 10/2001 |
| WO | 2004028119 | 4/2004 |

OTHER PUBLICATIONS

Official Communication for Chinese Patent Application No. 200780020715.1 mailed Mar. 1, 2011.
Official Communication for Korean Patent Application No. 10-2008-7032036 mailed Jun. 29, 2010.
Office Communication for Japanese Patent Application No. 2009-514451 mailed Jun. 27, 2011.
Official Communication for European Patent Application No. 04811415.1 mailed May 23, 2011.
Official Communication for Chinese Patent Application No. 200480044106.6 dated Oct. 9, 2009.
Official Communication for Japanese Patent Application No. 2007-534557 mailed Jul. 27, 2009.
Official Communication for Japanese Patent Application No. 2007-534557 mailed Apr. 12, 2010.
Official Communication for Japanese Patent Application No. 2007-534557 mailed Jun. 27, 2011.
International Search Report and Written Opinion for PCT/US2004/038699 mailed Dec. 26, 2007.
International Preliminary Report on Patentability for International patent Application No. PCT/US2004/038699 mailed Mar. 19, 2009.
International Preliminary Report on Patentability for International patent Application No. PCP/US2007/068796 mailed Dec. 24, 2008.
Official Communication for U.S. Appl. No. 10/951,982 mailed Oct. 17, 2007.
Official Communication for U.S. Appl. No. 10/951,982 mailed May 8, 2008.
Official Communication for U.S. Appl. No. 10/951,982 mailed Sep. 3, 2008.
Official Communication for U.S. Appl. No. 10/951,982 mailed Mar. 16, 2009.
Official Communication for U.S. Appl. No. 10/951,982 mailed Jun. 3, 2009.
Official Communication for U.S. Appl. No. 10/951,982 mailed Jul. 6, 2009.
Official Communication for U.S. Appl. No. 10/951,982 mailed Jan. 19, 2010.
Official Communication for U.S. Appl. No. 10/951,982 mailed Mar. 30, 2010.
Official Communication tor U.S. Appl. No. 10/951,982 mailed Oct. 14, 2010.
Official Communication for U.S. Appl. No. 10/951,982 mailed May 23, 2011.
Official Communication for U.S. Appl. No. 10/951,982 mailed Aug. 1, 2011.
Official Communication for U.S. Appl. No. 10/951,982 mailed Dec. 8, 2011.
Official Communication for U.S. Appl. No. 11/027,747 mailed Oct. 17, 2007.
Official Communication for U.S. Appl. No, 11/027,747 mailed Apr. 10, 2008.
Official Communication for U.S. Appl. No. 11/027,747 mailed Oct. 31, 2008.
Official Communication for U.S. Appl. No. 11/027,747 mailed May 11, 2009.
Official Communication for U.S. Appl. No. 11/027,747 mailed Jul. 7, 2009.
Official Communication for U.S. Appl. No. 11/027,747 mailed Aug. 31, 2009.
Official Communication for U.S. Appl. No. 11/027,747 mailed Feb. 26, 2010.
Official Communication for U.S. Appl. No. 11/027,747 mailed Apr. 30, 2010.
Official Communication for U.S. Appl. No. 11/027,747 mailed Feb. 28, 2011.
Official Communication for U.S. Appl. No. 11/027,747 mailed Sep. 13, 2011.
Official Communication for U.S. Appl. No. 11/027,747 mailed Nov. 2, 2011.

* cited by examiner

PROVIDING AN ACTIONABLE EVENT IN AN INTERCEPTED TEXT MESSAGE FOR A MOBILE DEVICE BASED ON CUSTOMIZED USER INFORMATION

FIELD OF THE INVENTION

The invention relates generally to communications with a mobile device, and more particularly but not exclusively to combining an actionable event with a text message for a mobile device based on customized information.

BACKGROUND OF THE INVENTION

The growth of the Internet has brought a corresponding increase in the number and variety of computing devices being employed to communicate over the Internet. Today's computing devices vary from desktop computers with a large variety of features and capabilities, to mobile devices, such as pagers, cellular phones, personal digital assistants (PDAs), and the like, with lesser features and/or capabilities. Many of these computing devices may, however, provide for what is known a text messages. Text messaging includes such communication protocols as Short Message Service (SMS) for providing connectionless transfers of limited size messages between networked computing devices. SMS messages may be cell broadcast services which are periodically delivered short message to a pre-defined set of computing devices in a given area, or point-to-point services which include short messages sent to a specific user. The SMS protocol is described in more detail in International Standard ISO/IEC 21989, as well as such documents as Global System for Mobile Communications (GSM) 03.38 and 04.11.

With the large usage of text messaging there has been a flurry of companies launching services that seek to leverage its popularity. Many of these companies, however, are struggling with developing additional services that will also build customer loyalty. Therefore, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of Various Embodiments, which is to be read in association with the accompanying drawings, wherein.

DETAILED DESCRIPTION OF THE INVENTION

Figure 1:
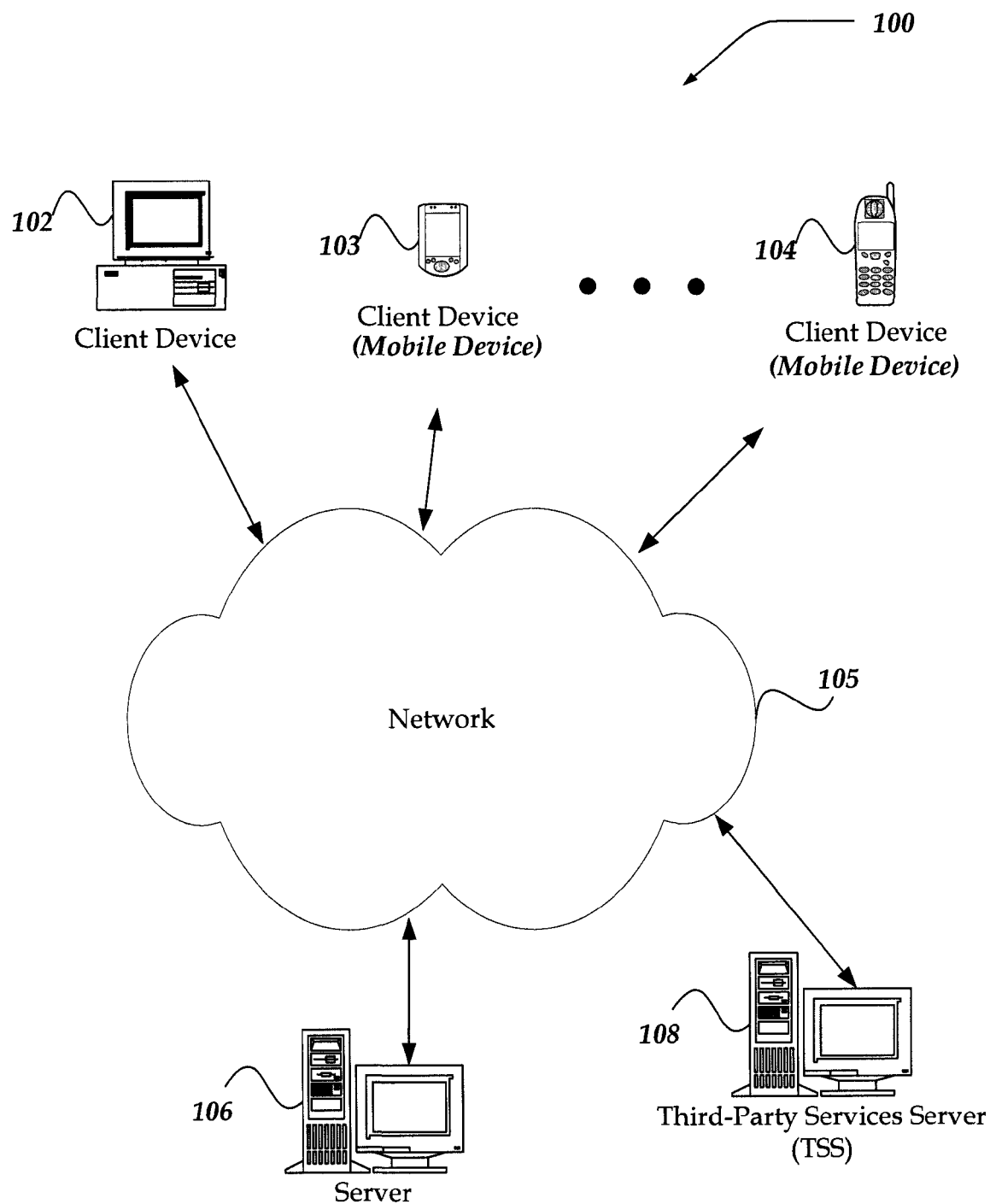
FIG. 1 shows a functional block diagram illustrating one embodiment of an environment in which to practice the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "protocol" refers to the format and procedures that governs the transmitting and receiving of data. The term "automatically" refers to an action that is performed by a computing device without additional interactions by a user.

As used herein, the terms "text messaging," or "text message" refer to SMS messaging, as well as a variety of other limited size message protocols, including, but not limited to Multimedia Messaging Service (MMS) message, or an Enhanced Message Service (EMS) message protocols.

Briefly stated, the present invention is directed towards intercepting a message, such as an SMS, EMS, MMS message, or the like from a source device directed towards a mobile device. The intercepted message's contents are analyzed. Analysis of the contents may include, but is not limited to looking for keywords, links, or the like. In addition, a mobile user profile is determined from characteristics of the mobile device and tracked usage of a mobile user of the mobile device. The tracked usage information may include, but is not limited to such information as web surfing patterns; applications most frequently accessed remotely by the mobile device; advertisements accessed through the mobile device; purchase patterns, including ringtones, wallpapers, applications, content, products, or services; or the like.

An actionable event may then be combined with the intercepted message based, in part, on the analysis of the content and the mobile user profile. The modified message is then provided to the mobile device, where the mobile user may select the actionable event to access non-requested content. The non-requested content may include, but is not limited to advertisements, suggestions, and/or recommendations for additional services, educational material, or the like.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 100 includes client devices 102-104, a network 105, and a server 106. Network 105 is in communication with and enables communication between each of client devices 102-104, and server 106.

Client devices 102-104 may include virtually any computing device capable of receiving and sending a message over a network, such as network 105, to and from another computing device, such as server 106, each other, and the like. As shown, devices 103-104 represent client devices that are portable or also known as mobile devices. One embodiment of a mobile device is described in more detail below in conjunction with FIG. 2.

Briefly, however, client devices 102-104 include mobile devices that are usually considered more specialized devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. However, the set of such devices that represent client devices 102-104 may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client devices 102-104 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 102-104 includes a user interface that enables a user to control settings, and to instruct the client device to perform operations. Each client device also includes a communication interface that enables the client device to send and receive messages from another computing device employing the same or a different communication means, including, but not limited to SMS, MMS, IM, internet relay chat (IRC), Mardam-Bey's internet relay chat (mIRC), Jabber, email, and the like. Client devices 102-104 may be further configured with a browser application that is configured to receive and to send markup pages, web-based messages, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

Network 105 is configured to couple one computing device to another computing device to enable them to communicate. Network 105 is enabled to employ any form of medium for communicating information from one electronic device to another. Also, network 105 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between client devices 102-104, and server 106. Network 105 is constructed for use with various communication protocols including wireless application protocol (WAP), transmission control protocol/internet protocol (TCP/IP), code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

One embodiment of server 106 is described in more detail below in conjunction with FIG. 3. Briefly, however, server 106 includes virtually any computing device capable of connecting to network 105 to intercept text messages directed to a mobile device, and to provide services and information with the intercepted text messages based on a mobile user profile and contents of the intercepted text message. In one embodiment, server 106 may also intercept a response message from the mobile device, and perform substantially similar actions upon the intercepted response message, including, inserting another actionable event into the response message based on a recipient's user profile, and the contents of the intercepted response message.

In one embodiment, server 106 may provide content associated with the actionable event from its own data store. In one embodiment, server 106 may also provide content associated with the actionable event, from another server (not shown).

Server 106 may operate, in one embodiment, as a service provider, content provider, or the like. Thus, server 106 may provide networking services, application services, content services, or the like. In one embodiment, server 106 may operate a service that manages various communications between computing devices, such as client devices 102-104, or other network devices. For example, server 106 may be configured to provide email services, IM services, SMS services, web portal services, or the like. In one embodiment, server 106 may provide a service that may include an account. In one embodiment, a user may be requested to log into the account to access one or more services, content, or the like. However, the invention is not so constrained, and access to one or more services may be obtained independent of logging into an account.

Third-Party Services Server (TSS) 108 includes virtually any computing device capable of connecting to network 105 and is directed to providing various third-party services. Such third-party services include but are not limited to providing merchant services, merchant location information, marketplace services, news services, weather services, entertainment services, educational services, financial services, and the like. For example, TSS 108 may provide information about merchants that may be within a geographical proximity to a mobile device, near where a particular mobile device is frequently used, or the like. TSS 108 may also provide RSS feeds, emails, text messages, or the like, to mobile devices that may include a variety of information of potential interest to a recipient.

Devices that may operate as server 106 and TSS 108 include personal computers desktop computers, multiprocessor systems, microprocessor-based or programmable consumer electronics, network PCs, servers, and the like.

Although server 106 is shown as a distinct computing device, the invention is not so constrained. For example, server 106 may also represent a plurality of computing devices, with its actions distributed across one or more of the plurality of computing devices. Moreover, TSS 108 may also represent a plurality of computing devices.

Illustrative Mobile Client Environment

Figure 2:
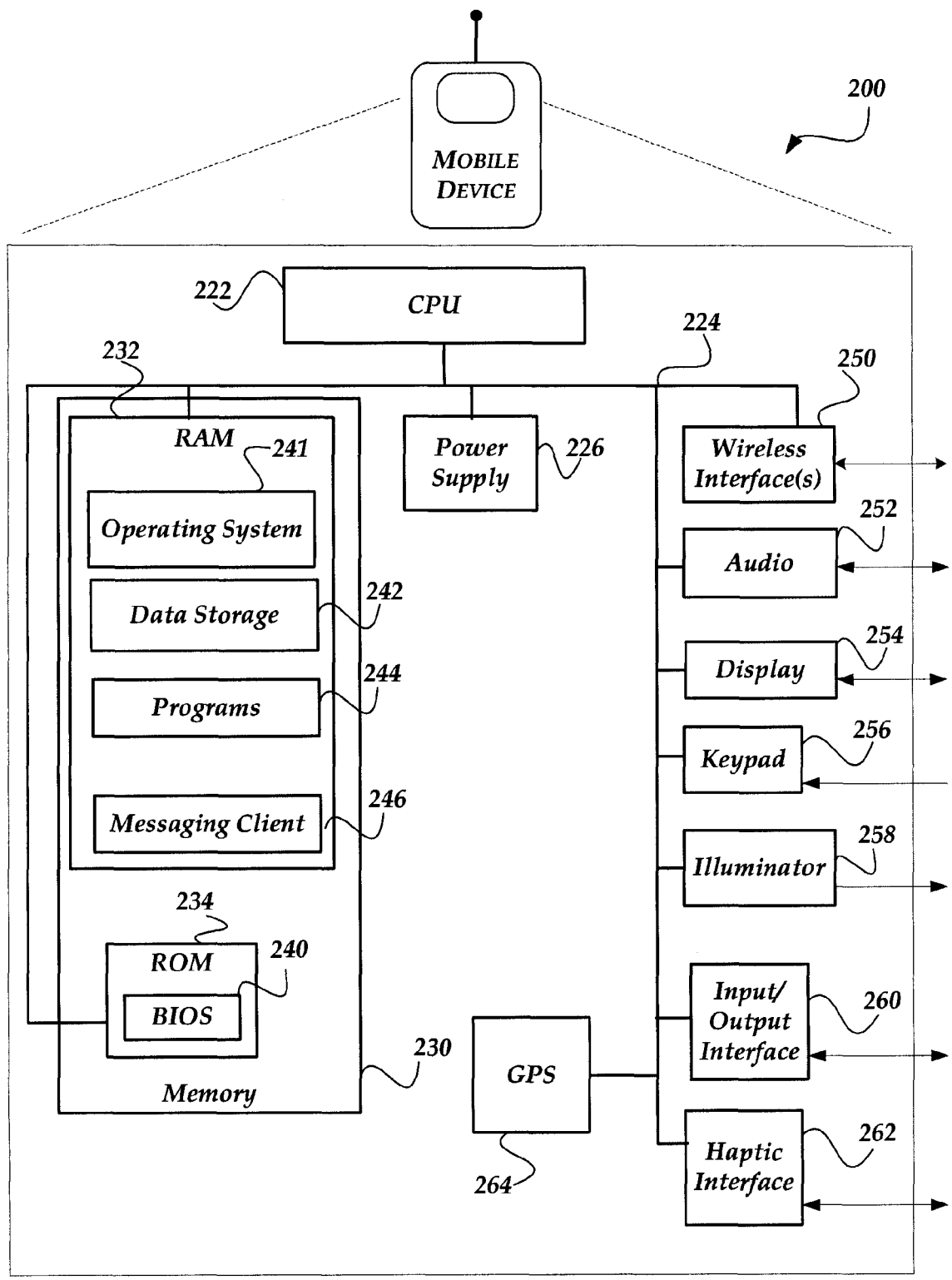
FIG. 2 shows one embodiment of a client device that may be employed in the environment of FIG. 1.

FIG. 2 shows an exemplary mobile device 200, according to one embodiment of the invention. In one embodiment, mobile device 200 is a cellular telephone that is arranged to send and receive voice communications and messages such as SMS, EMS, MMS messages, or the like, via one or more wireless communication interfaces. Generally, mobile device 200 may comprise any personally mobile electronic device. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Such devices include cellular telephones, smart phones, pagers, radio frequency (RF) devices, infrared (IR) devices, integrated devices combining one or more of the preceding devices, and the like. Mobile device 200 may also comprise other electronic devices that such as Personal Digital Assistants (PDAs), handheld computers, personal computers, multiprocessor systems, microprocessor-based or programmable consumer electronics, network PCs, wearable computers, and the like.

Mobile device 200 may include many more components than those shown in FIG. 2. However, the components shown are sufficient to disclose an illustrative embodiment for practicing the present invention. As shown in the figure, mobile device 200 includes a processing unit 222 in communication with a mass memory 230 via a bus 224.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized mobile communication operating system such as Windows Mobile™, or the Symbian® operating system. The operating system may include, or interface with a Java virtual machine module that enables control of hardware components and/or operating system operations via Java application programs.

Memory 230 further includes one or more data storage units 242, which can be utilized by mobile device 200 to store, among other things, programs 244 and/or other data. Programs 244 may include computer executable instructions which, when executed by mobile device 200, transmit, receive, and/or otherwise process messages, audio, video, and the like, and enable telecommunication with another user of another mobile device. Examples of application programs include calendars, contact managers, task managers, transcoders, database programs, word processing programs, spreadsheet programs, games, and so forth. In addition, mass memory 230 stores a browser program. The browser program may include computer executable instructions, which may be run under control of operating system 241 to enable and manage requesting, receiving, and rendering markup pages such as WAP pages (sometimes referred to as WAP cards), and the like. Mass memory 230 may also include a message client 246 that is arranged to transmit, receive, and/or otherwise process messages including SMS, MMS, IM, email, and/or other message protocols. In one embodiment, one or more of the received messages may include an actionable event that may be selected. Selection of the actionable event may result in opening a browser window, retrieving a hyperlink message, dialing a telephone number, providing a text message, or the like. In one embodiment, the actionable event may include a URL that when selected opens a WAP page that includes additional content, a notification, an advertisement, or other non-requested content.

Mobile device 200 also includes a power supply 226, one or more wireless interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another mobile device. Wireless interface 250 includes circuitry for coupling mobile device 200 to one or more wireless networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), and the like. Wireless interface 250 is sometimes known as a transceiver, transceiving device, wireless network interface card (NIC), and the like.

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a mobile device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the mobile device is powered. Also, illuminator 258 may backlight these buttons in various patterns when particular actions are performed, such as dialing another mobile device. Illuminator 258 may also cause light sources positioned within a transparent or translucent case of the mobile device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 is arranged to provide tactile feedback to a user of the mobile device. For example, the haptic interface may be employed to vibrate mobile device 200 in a particular way when another user of a mobile device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances.

Illustrative Server Environment

Figure 3:
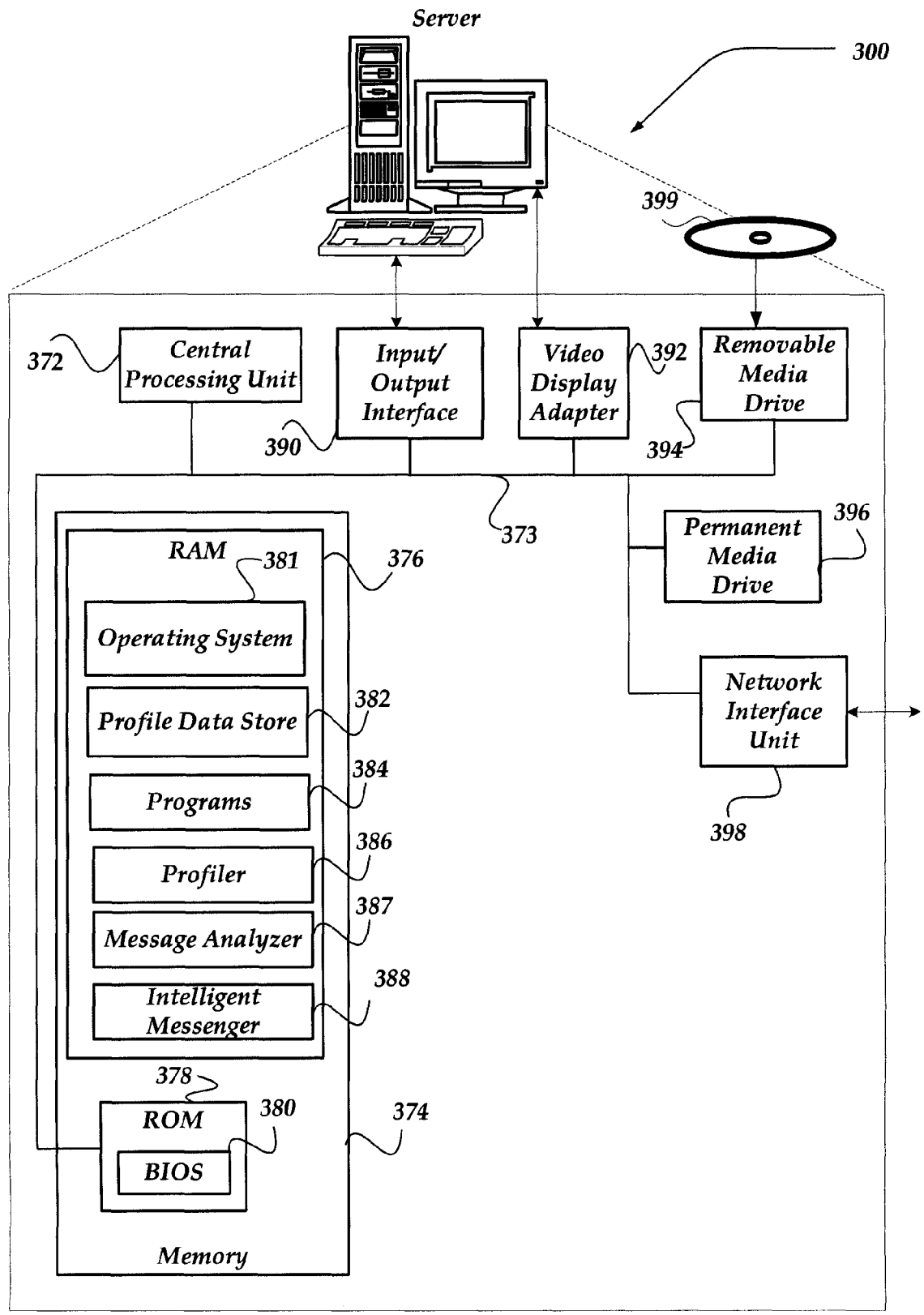
FIG. 3 shows one embodiment of a network device that may be employed in the environment of FIG. 1.

FIG. 3 shows one embodiment of a network device that may be employed in the environment of FIG. 1 as server 106. Briefly, server device 300 may include any computing device capable of connecting to network 105 to receive and provide services and information to client devices and/or other computing devices. Server device 300 may include many more components than those shown. The components shown, however, are sufficient to disclose an illustrative embodiment for practicing the invention. Many of the components of server device 300 may also be duplicated in a higher capability client device that a mobile use may use for browsing web pages and/or other computing activities, in addition to using the mobile device.

As shown in the figure, server device 300 includes a processing unit 372 in communication with a mass memory 374 via a bus 373. Mass memory 374 generally includes a RAM 376, a ROM 378, and other storage means. Mass memory 374 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 374 stores a basic input/output system ("BIOS") 380 for controlling low-level operation of server device 300. The mass memory also stores an operating system 381 for controlling the operation of server device 300. It will be appreciated that this component may include a general purpose operating system such as a version of Windows™, UNIX, LINUX™, Solaris™, or the like. The operating system may also include, or interface with a Java virtual machine module that enables control of hardware components and/or operating system operations via Java application programs.

Mass memory 374 further includes one or more profile data store 382, which can be utilized by server device 300 to store, among other things, programs 384 and/or other data, including but not limited to mobile user profile data. As such profile data store 382 may be implemented as a folder; a program such as a spreadsheet, database, or the like; a script, a directory, or the like.

Programs 384 may include computer executable instructions which can be executed by server device 300 to implement a markup handler application, such as a WAP handler application for transmitting, receiving, and otherwise processing WAP communications, an HTTP handler application for transmitting, receiving, and otherwise processing HTTP communications, and the like. Similarly, programs 384 can include a secure socket layer (SSL) handler application for handling secure connections, such as initiating communication with an external application in a secure fashion. Other examples of application programs include messaging applications, schedulers, calendars, web services, transcoders, database programs, word processing programs, spreadsheet programs, and so forth. Accordingly, programs 384 can process markup pages, audio, video, enable telecommunication with another user of another electronic device, and other services.

Other programs within memory 374 include profiler 386, message analyzer 387, and intelligent messenger 388. Profiler 386, message analyzer 387, and intelligent messenger 388 are described in more detail below in conjunction with FIG. 4. Briefly, however, profiler 386 may include computer executable instructions, which may be run under control of operating system 381 to enable collection and analysis of a mobile device's usage. Message analyzer 387 may similarly include computer executable instructions which enable an intercepted message, such as an SMS, EMM, MMS, IM message, or the like, to analyze its contents. Such analysis may be performed by searching for various keywords, sentence constructs, syntax, nouns, and the like. Such analyzed content may be compared to information stored in a database, to identify potential characteristics about the intercepted message. For example, the analysis may include determining whether music, movies, audio files, graphical files, or the like are being referenced. The analysis may also look to for content that may indicate an interest in a particular type of music, musician, singer, book, applications, games, item of purchase, ringtones, or any of a variety of other subjects.

Intelligent messenger 388 may employ the results of the analysis, and the mobile user's profile to combine an actionable event with the intercepted message. Such actionable events may be implemented as a selectable URL, a telephone number, text, or the like. In one embodiment, the selection of the telephone number may result in the telephone number being automatically dialed. In another embodiment, the text may indicate an action to take by the mobile user. For example, the text may indicate that if the mobile user so desires they may download an application by performing some action. However, the text may also include a notification about an advertisement, or the like, that the mobile user may at some later time act upon. Intelligent messenger 388 may then forward the modified message towards its originally directed destination.

Although profile data store 382, profiler 386, message analyzer 387, and intelligent messenger 388 are illustrated as distinct applications; the invention is not so limited. For example, message analyzer 387, and intelligent messenger 388 may be combined into one application. Moreover, one or more or profile data store 382, profiler 386, message analyzer 387, and intelligent messenger 388 may distributed across one or more devices such as server device 300, without departing from the scope or spirit of the invention.

Server device 300 also includes an input/output interface 390 for communicating with input/output devices such as a keyboard, mouse, wheel, joy stick, rocker switches, keypad, printer, scanner, and/or other input devices not specifically shown in FIG. 3. A user of server device 300 can use input/output devices to interact with a user interface that may be separate or integrated with operating system 381, programs 384, and/or other modules. Interaction with the user interface includes visual interaction via a display, and a video display adapter 392.

Server device 300 may include a removable media drive 394 and/or a permanent media drive 396 for computer-readable storage media. Removable media drive 394 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 399, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 398, server device 300 can communicate with a wide area network such as the Internet, a local area network, a wired telephone network, a cellular telephone network, or some other communications network, such as network 105 in FIG. 1. Network communication interface unit 398 is sometimes known as a transceiver, transceiving device, network interface card (NIC), and the like.

Illustrative Architecture

Figure 4:
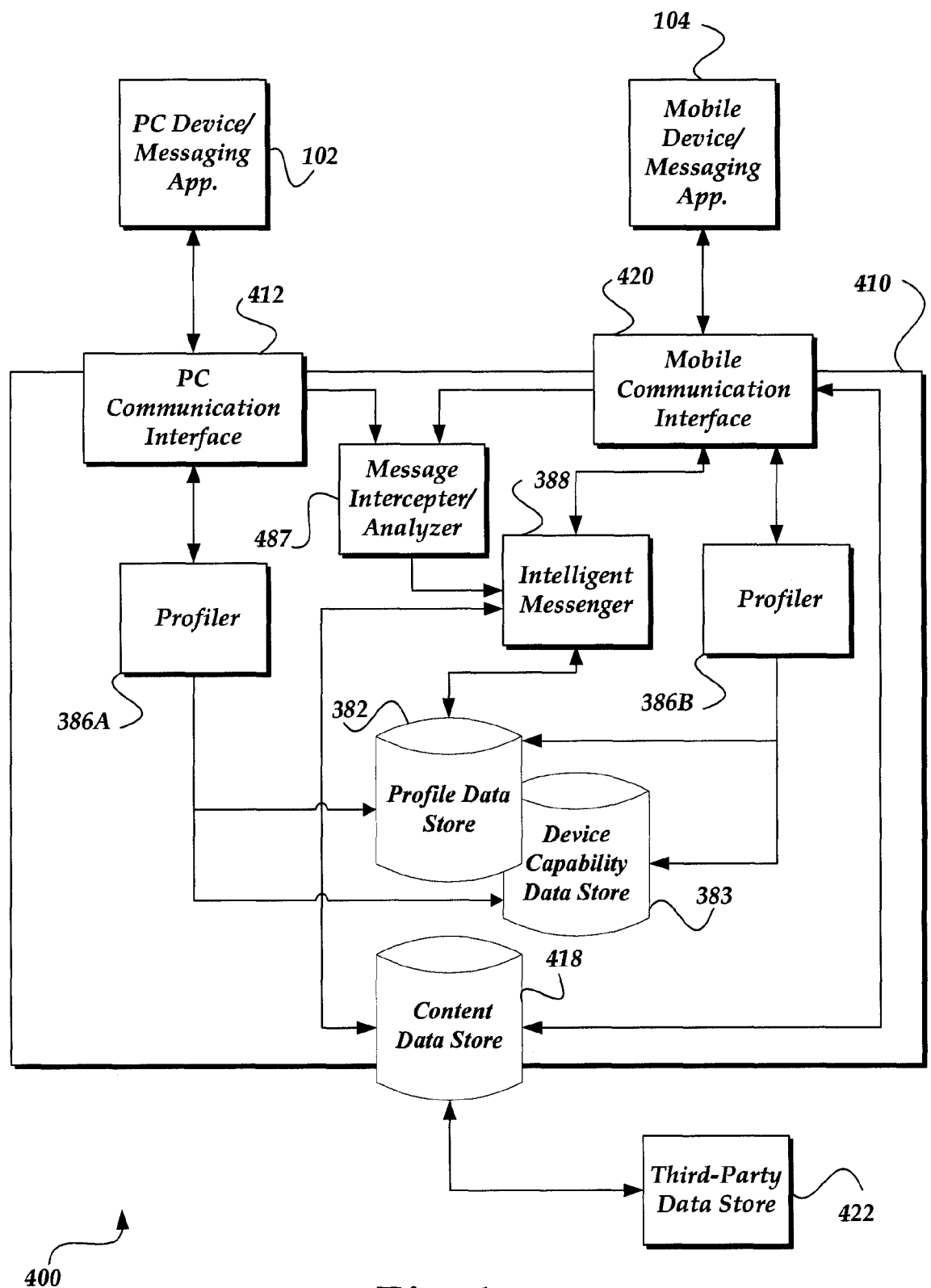
FIG. 4 illustrates one embodiment of an architecture for use in implementing the invention.

FIG. 4 illustrates one embodiment of an architecture for use in implementing the invention. Architecture 400 of FIG. 4 is described in terms of a mobile device 104 communicating through service 410 with another computing device. As shown, the other computing device is personal computer (PC) device 102. However, the other computing device may also be another mobile device, or other computing device configured as a client device such as described in conjunction with FIG. 1. Services 410 may be implemented within server 106 of FIG. 1.

Services 410 may, in one embodiment, generally provide an aggregate source for a wide variety of content, including, but not limited to news, economic information, messaging services, online search services, entertainment services, social interaction services, or the like. In one embodiment, services 410 may operate as a portal service, through which a variety of services may be accessed by different network devices. In one embodiment, at least some content may be stored in content data store 418. In another embodiment, content data store 418 may include links to other network devices from which content, services, or the like, may also be accessed. For example, as shown, content data store 418 may receive content, services, or the like, from third-party data store 422. For example, third-party data store 422 may include a variety of content, such as that described above. In addition, in one embodiment, third-party data store 422 may include information about where a merchant is located.

In one embodiment, the content, services, or the like, from third-party data store 422 may be directly accessible by intelligent messenger 388, rather than being accessed through content data store 418. Moreover, it should be recognized that while content data store 418 and third-party data store 422 are illustrated as single devices, the invention is not so limited. For example, third-party data store 422 and/or content data store 418 may represent a plurality of data stores.

As shown in FIG. 4, PC device 102 may communicate through PC communication interface 412, which may be a part of, or coupled to services 410. PC communication interface 412 may assist in enabling a communication with mobile device 104 by communicating a message towards mobile communications interface 420, which may also be a part of, or coupled to services 410. PC communications interface 412 may communicate with mobile communications interface 420 though message interceptor/analyzer 487. Message interceptor/analyzer 487 is configured to intercept messages between PC device 102 and mobile device 104 and perform an analysis on its contents. In one embodiment, message interceptor/analyzer 487 may search for key words, pre-defined syntax, sentences, nouns, or the like. Message interceptor/analyzer 487 may, in one embodiment, employ a data store and/or program to analyze the contents, and provide a result of the analysis to intelligent messenger 388. At least some of the results of the analysis may be stored in profile data store 382.

As mobile device 104 performs various actions over a network, mobile communications interface 420 may receive at least some of the communications, and provide them to profiler 386B. Profiler 386B may review the received communications to track and evaluate various activities performed through mobile device 104, including browsing activities, communications, purchasing activities, download activities, requests for execution of remote applications, or the like. For example, where an actionable event may have been provided to mobile device 104, whether or not the user of mobile device 104 clicked on the actionable event, a rate of clicks, a rate of click through of the actionable events, what type of actionable events are selected, or otherwise not selected may also be tracked. Similarly, any other links, or selectable information whether on a web page, within a message, or the like, may also be tracked and evaluated for similar behaviors. Moreover, in one embodiment, information about a geographic location of mobile device 104 may also be obtained.

The results of such tracking and evaluations are to generate a mobile user profile that may then be stored in profile data store 382. In one embodiment, the mobile user profile is stored within profile data store 382 based on a mobile user, mobile user's account, or other unique identifier of the mobile user associated with mobile device 104. Also stored in profile data store 382 may be characteristics of mobile device 104, including for example, a capability, a device type, applications hosted on mobile device 104, a carrier associated with mobile device 104, or the like. However, the invention is not so limited. For example, as shown, in one embodiment, device capability store 383 may be used to store characteristics of mobile device 104, without departing from the scope or spirit of the invention.

Similarly, PC communications interface 412 may also be configured to receive at least some of the communications of PC device 102, and provide them to profiler 386A. Profiler 386A may review the received communications to track and evaluate various activities performed through PC device 102, including browsing activities, communications, purchasing activities, download activities, requests for execution of remote applications, or the like. The results of such tracking and evaluations are to generate a user profile that may be stored in profile data store 382. Similarly, characteristics of PC device 102 may also be stored on profile data store 382.

As a communications, such as a text message is intercepted between PC device 102 and mobile device 104, intelligent messenger 388 may employ information from message interceptor/analyzer 487 and profile data store 382 to select and combine an actionable event with the intercepted message, wherein the actionable event is associated with non-requested content. Intelligent messenger 388 may then forward the modified message towards its original destination (PC device 102 or mobile device 104). In one embodiment, services 410 may employ processes such as described below in conjunction with FIGS. 5-6 to perform at least some of its actions.

Illustrative Processes

Figure 5:
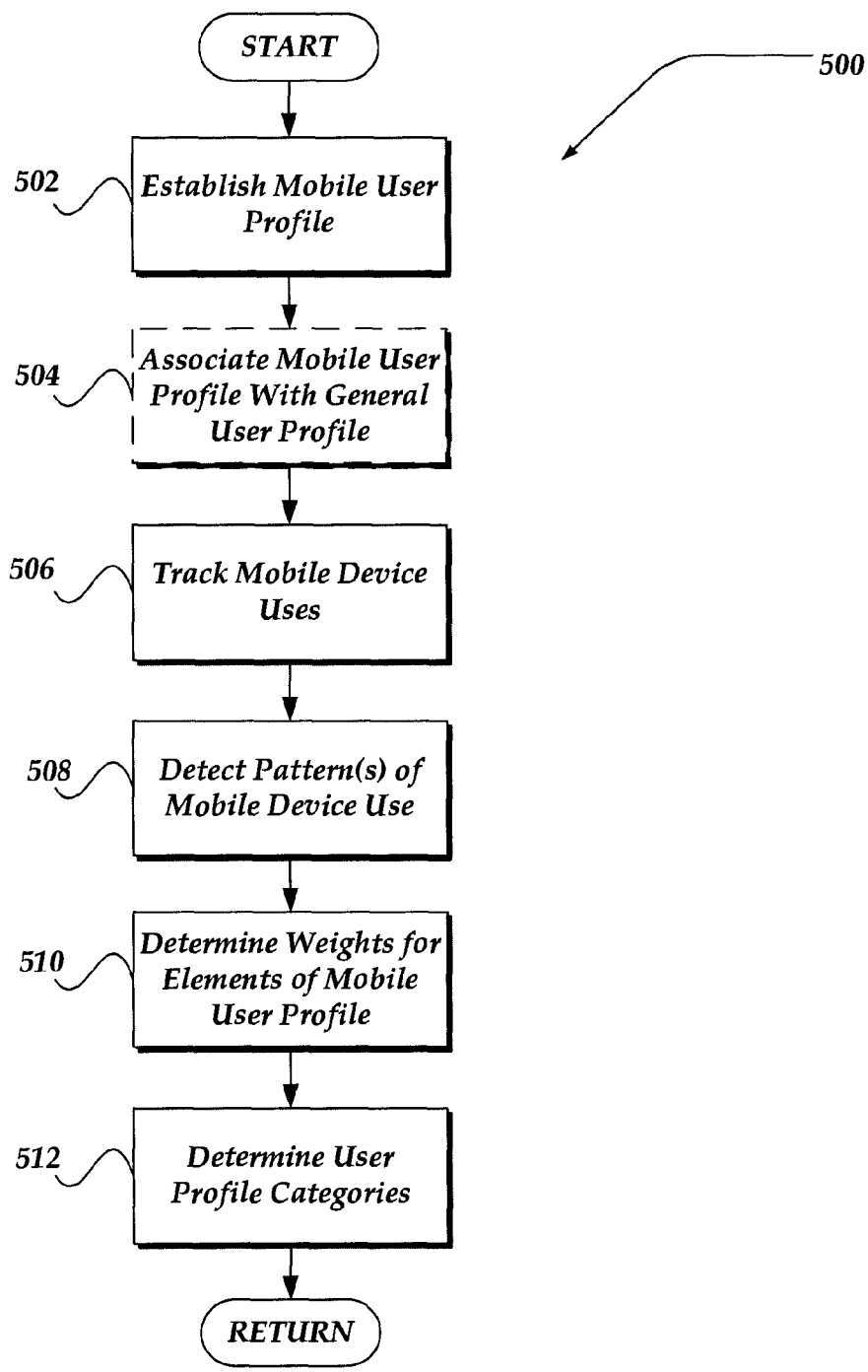
FIG. 5 illustrates one a logical flow diagram generally showing one embodiment of a process for use in generating a mobile user profile.

FIG. 5 illustrates one a logical flow diagram generally showing one embodiment of a process for use in generating a mobile user profile. Process 500 of FIG. 5 may be implemented, for example, in server 106 of FIG. 1.

When a mobile device initially communicates with service, the service establishes a mobile user profile, at block 502. Communication with the mobile device provides some basic information to the service, including a device model number, a carrier identifier, a mobile identification number (MIN), and the like. The MIN is often a telephone number, a Mobile Subscriber Integrated Services Digital Network (MS-ISDN), an electronic serial number (ESN), or other mobile device identifier. The service may use the basic information to access other information regarding the mobile device from the mobile device manufacturer, distributor, trade group, and/or other sources.

In one embodiment, the mobile user profile can be based, at least in part, on a user agent profile, such as that defined by the User Agent Profile Specification available from the Wireless Application Protocol Forum, Ltd. Another example of obtaining information about a mobile device includes using Composite Capability/Preference Profiles (CC/PP), defined by the World Wide Web Consortium. Further examples of profiles describing mobile device capabilities include a mobile information device profile (MIDP), a wireless universal resource file (WURFL), and the like. A user agent profile or other standardized profile generally includes attributes of the mobile device, such as a screen size, a screen resolution, a memory size, and the like. The service can use a user agent profile or other standardized profile to start a mobile user profile, which is then modified with alternate and/or additional information.

Also, a header of communications between the mobile device and the service may also be evaluated. In addition to identifying a make, model, MIN, screen size, and other information about the mobile device, the header may indicate, or be used to determine, communication speed, throughput, and/or other communication characteristics. The communication characteristics can be averaged and/or otherwise evaluated to determine such things as the conditions at those times that the user most often uses the mobile device.

For example, the service may initially modify the mobile user profile to add information about capabilities, services, contractual agreements, and/or limitations of the mobile user's carrier and/or service plan. For instance, the service may use outside sources or out-band-communications to determine that the user's carrier offers online photo management to subscribers of certain service plans. If the service determines that the mobile user subscribes to one of those certain plans, that information can be stored in the mobile user profile.

At an optional block 504, the service can associate the mobile user profile with a general user profile that the user may already have established with the service. The user may already have a portal account through a network connection with a general purpose computing device (e.g. a PC), an entertainment system, another mobile device, and the like. The association of profiles can take multiple forms. For example, the mobile user profile may form the basis of the general user profile. Alternatively, the elements of a mobile user profile may be added to an existing general user profile. Conversely, the mobile user profile may remain separate from, but linked to the general user profile. Other associations are also possible. If the mobile user is not registered with the service, the mobile user profile may stand alone, and be identified by the mobile device identifier.

With the mobile user's permission, the service tracks browsing activities, purchasing activities, locations, and other actions of the mobile user at block 506. For example, the service may log content that the mobile user requests, web sites that the mobile user accesses, when the mobile user accesses those sites, and the geographic location at which the mobile user accesses those sites. The service may also log purchases, surfing activities, most frequently used remote applications, advertisements accessed by the mobile device, or the like.

The service may also log indirect information, such as the season of the year in which the mobile user accesses certain sites, the weather conditions on days that the mobile user accesses certain sites, and the like. The service may further track the mobile user's online purchases through the mobile device and/or through the mobile user's corresponding account with general purpose computing devices. Based on latitude and longitude information, the service can also determine and store related information, such as merchants that are near locations at which the user frequently uses the mobile device. The service may also note that the mobile user has subscribed to an alert service, news service, music service, game service, an RSS feed, or the like.

The service may inform those merchants, who may wish to purchase the opportunity to provide advertisements or other content to the mobile user, especially the next time that the mobile device is detected near the merchant locations, or around the time that the mobile user is expected to be near the merchant locations, based on the mobile user's movement and/or usage habits, and/or communications with another computing device.

In addition, the service may track characteristics of and/or changes to the mobile device. For example, the mobile user may purchase a different, and/or an additional mobile device. When the mobile user accesses the service with a new mobile device, the service can ask, or otherwise determine, whether the mobile user already has an existing mobile user profile and/or general user profile to which the new mobile device can be associated. For example, if the mobile user uses the same telephone number with a new mobile device (and/or a new mobile carrier), the service can access the mobile user profile associated with that telephone number. The service can also access a new user agent profile to obtain information about the new mobile device, and access carrier information associated with the new mobile device (and/or the new mobile carrier). The new information can be added to the existing mobile user profile, or a separate mobile user profile can be associated with the original mobile user profile and/or a corresponding general user profile.

Based on the tracked information, the service may detect one or more patterns, habits, characteristics, and/or other information, at block 508. For example, the service may note that the mobile user regularly checks a certain financial web site for a certain set of company stock quotes, while at a certain location every week. The service may note that the mobile user regularly checks the weather and local news of a remote city, and sometimes checks flight prices to that city. The service may further note that the mobile user purchases a new, high performance mobile device every six months. The service can also determine and store related information, such as pricing information of mobile devices that the user has purchased, the carrier plans and features to which the user has subscribed, third party products and services purchased by the mobile user for use with the user's mobile device(s), products and services that are similar products and services to those the user has purchased, and the like.

In addition, the service may look for patterns and the like, based on whether or not the mobile user selects a displayed actionable event, link, or the like, as well as patterns on rates of click throughs of links, types of links selected, or the like. Patterns may also be determined based on key words, subject matter, or the like. For example, where the mobile user might receive messages that include the word "Beatles," it might be noted that when the mobile user receives a message related to music, the music message is seldom selected. However, if the mobile user also receives a message related to insects and selects that link, it might be concluded that the mobile user has a preference to entomology rather than the musical Beatles. The invention is not limited to detecting only these patterns, and other patterns, behaviors, and the like may also be sought. For example, patterns based on keywords may also be evaluated.

In conjunction with the service, some or all of the tracking and pattern detection operations can be performed by server software modules of the service and/or a client software module running on the mobile device.

From the patterns, the service can determine weights for elements of the mobile user profile at an optional block 510. For example, the service may apply higher weights to elements that indicate interest in financial investments and technical gadgets. The patterns and/or weights can be used at an optional block 512 to determine one or more general and/or consumer categories that describe the mobile user, such as a sophisticated technology user, a socially active person, a job seeker, a family-focused person, a frequent gamer, a bargain hunter, and the like. Indicators of the categories may be stored in the mobile user profile. The service can then use the patterns, weights, and/or categories in conjunction with other information, to insert an actionable event into an intercepted message.

Figure 6:
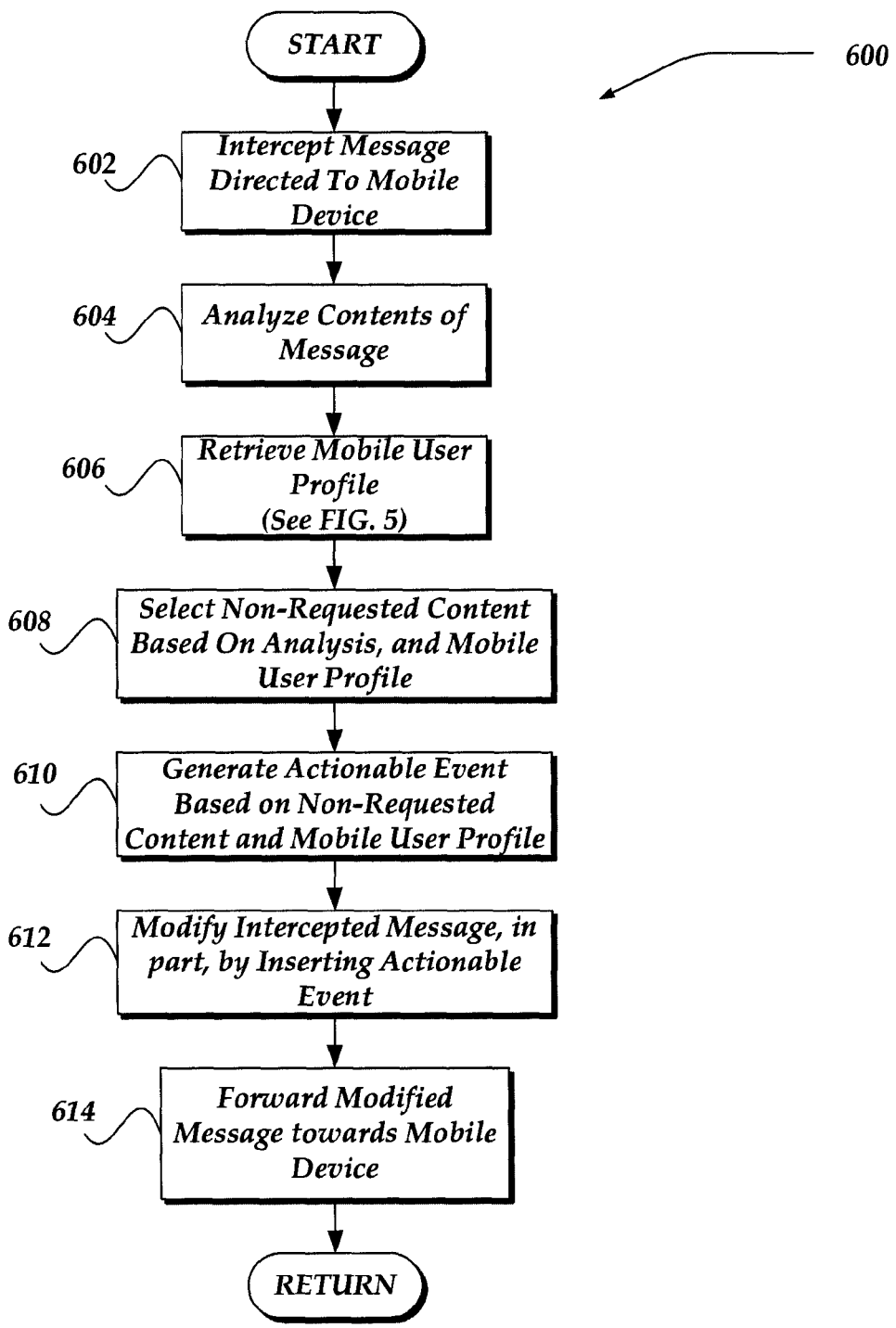
FIG. 6 illustrates one a logical flow diagram generally showing one embodiment of a process for use in dynamically inserting an actionable event into an intercepted text message, based on the mobile user profile, and contents of the intercepted message.

FIG. 6 illustrates a logical flow diagram generally showing one embodiment of a process for use in dynamically inserting an actionable event into an intercepted text message, based on the mobile user profile, and contents of the intercepted message. Process 600 of FIG. 6 may be implemented, for example, into server 106 of FIG. 1.

Process 600 begins, after a start block, at block 602, where a message, such as a text message is intercepted. By intercepting an existing message directed from one computing device to another, the invention may leverage the contents of the message to provide actionable events that may be relevant to the intercepted contents and improve a likelihood that the actionable event is selected to access non-requested content. In one embodiment, the interception is managed through a service provider, message carrier service or the like.

Processing then flows to block 604 where the intercepted message's contents are analyzed. In one embodiment, the message contents are searched for keywords, sentences, nouns, URLs, attachments, phone numbers, or the like that may represent an interest, a purchase, or relate to potential non-requested content.

Process 600 moves next to block 606 where a mobile user profile associated with the destination mobile device is retrieved. In one embodiment, the mobile user profile includes characteristics of the destination mobile device and tracked usage information of the mobile device by a mobile user. In one embodiment, the mobile user profile may be determined based on actions described above in conjunction with FIG. 5.

Processing continues to block 608 where non-requested content may be selected that based on the analyzed content and the mobile user profile. For example, in one embodiment, the analyzed content may make mention, or otherwise allude to music, ringtones, or the like. For example, in one embodiment, the intercepted message may be a music alert for which the mobile user is signed up to receive. In addition and/or the mobile user profile may indicate an interest, purchasing trend, or the like, in a type of music, ringtone, musician, or the like. Non-requested content may be selected that encourages the mobile user to purchase another ringtone, music, or the like, associated with the analyzed content and/or mobile user's tracked activities.

In another example, the intercepted message may be sent to a mobile user that may not be subscribed to an available service associated with the analyzed content and/or the mobile user's tracked activities. The non-requested content may then include information about the service.

Processing then flows to block 610, where an actionable event may be generated based on mobile user's profile and analyzed content. For example, where the mobile user's profile indicates that the mobile device includes a screen display that may be too small for a long URL, a phone number may be selected as the actionable event. Similarly, other actionable events may be selected based on any of a variety of characteristics of the mobile device, include such actionable events as a URL that may open a WAP browser page, a telephone number that when selected automatically dials the displayed telephone number, text that may displayed and indicates an action the mobile user may take, an audio file, a video file, a graphic, or the like. In any event, the actionable event is configured to enable the mobile user to access the non-requested content.

Thus, process 600 moves to block 612, where the intercepted message is modified by combining it with the actionable event. In one embodiment, the actionable event may be inserted in any of a variety of locations with the intercepted message, including at a beginning of the intercepted message, within the intercepted message, or even appended to the intercepted message. In another embodiment, the entire intercepted message may be replaced by a URL link to a browser page that includes the intercepted message and the non-requested content, or the actionable event which in turn accesses the non-requested content.

Processing then flows to block 614, where the modified message is forwarded to the mobile device, where the mobile user is enabled to display and to select the actionable event to receive the non-requested content.

In one embodiment, the mobile user may provide a response message, such as an SMS message, MMS message, EMS message, or the like, to the modified message. In one embodiment, the response message may also be intercepted by the service. The intercepted response message may then also be analyzed along with a user profile of the recipient device and user. Another actionable event associated with another non-requested content may then be combined with the intercepted response message using substantially similar actions as described above.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A network device for use in providing content to a mobile device over a network, comprising:
   a memory component for storing data; and
   a processing component configured to execute data that enables actions, including:
   intercepting a message from a source device directed to a mobile device;
   determining a mobile user profile from characteristics of the mobile device, and from a tracked usage of the mobile device by a mobile user; analyzing content of the intercepted message;
   analyzing the tracked usage of the mobile device to detect one or more patterns of usage over time;
   analyzing the one or more patterns of usage over time to determine one or more consumer categories for which to describe the mobile user;
   modifying the intercepted message with an actionable event based on the mobile user profile, the detected one or more patterns of usage over time, the one or more consumer categories, and the analyzed content;
   providing the modified message to the mobile device, wherein the mobile user is enabled to select the actionable event to receive non-requested content; and
   revising the mobile user profile based on a determination that the actionable event is not selected by the mobile user.

2. The network device of claim 1, wherein determining the mobile user profile further comprises determining a geographic location of the mobile device, and wherein modifying the intercepted message further comprises also employing the geographic location to determine the actionable event with which the intercepted message is modified.

3. The network device of claim 1, wherein the tracked usage of the mobile device further includes logging indirect information that includes a weather condition on a day when the mobile device is used to access a particular website.

4. The network device of claim 1, wherein modifying the intercepted message further comprises weighting different elements within the mobile user profile and the detected one or more patterns to modify the intercepted message.

5. The network device of claim 1, wherein the intercepted message is at least one of a Short Message Service (SMS) message, Multimedia Messaging Service (MMS) message, or an Enhanced Message Service (EMS) message.

6. The network device of claim 1, wherein the actionable event further comprises at least one of a text message, a graphic, an audio file, or a video file that is arranged to prompt an action over the network by the mobile user of the mobile device.

7. The network device of claim 1, wherein modifying the intercepted message further comprises inserting the actionable event into the intercepted message.

8. The network device of claim 1, wherein modifying the intercepted message further comprises replacing the contents of the intercepted message with at least a portion of the intercepted message and the actionable event.

9. The network device of claim 1, wherein modifying the intercepted message further comprises replacing the contents of the intercepted message with a Uniform Resource Locator (URL) or a phone number to the contents of the intercepted message and the non-requested content.

10. A non-transitory processor readable storage medium comprising instructions, wherein the execution of the instructions provides for managing a communication over a network with a mobile device by enabling actions, including:
    intercepting a message from a source device directed to a mobile device; analyzing content of the intercepted message;
    determining a mobile user profile from characteristics of the mobile device, and from a tracked usage of the mobile device by a mobile user;
    modifying the mobile user profile to include a detected one or more patterns of usage determined from the tracked usage of the mobile device by the mobile user over time;
    modifying the mobile user profile to further include a determined one or more consumer categories for which to describe the mobile user based on analysis of the detected one or more patterns of usage;
    selecting non-requested content based on the analysis, and the mobile user profile including the detected one or more patterns of usage;
    generating an actionable event based on the non-requested content and at least one characteristic of the mobile device;
    modifying the intercepted message by combing the actionable event with the intercepted message;

forwarding the modified message to the mobile device, wherein the mobile user is enabled to select the actionable event to receive non-requested content; and revising the mobile user profile if the actionable event is not selected.

11. The non-transitory processor readable storage medium of claim 10, wherein the generating the actionable event is further based on weightings for elements in the mobile user profile including weightings for the one or more patterns of usage over.

12. The non-transitory processor readable storage medium of claim 10, wherein the actionable event further comprises at least one of a text message, a graphic, an audio file, or a video file that is arranged to prompt an action over the network by the mobile user of the mobile device.

13. The non-transitory processor readable storage medium of claim 10, wherein the non-requested content further comprises at least one of the following: an advertisement, a notice of an event related to the content of the intercepted message, additional content from the source device, or instructions on an available service.

14. The non-transitory processor readable storage medium of claim 10, wherein the characteristics of the mobile device are determined from at least one of a mobile device identifier or a mobile user agent profile.

15. A method of managing a mobile communication over a network, comprising:

intercepting a message from a source device directed to a mobile device; analyzing content of the intercepted message;

determining a mobile user profile from characteristics of the mobile device, and from a tracked usage of the mobile device by a mobile user;

analyzing the tracked usage of the mobile device to detect one or more patterns of usage of the mobile device over time by the mobile user;

analyzing the one or more patterns of usage to identify at least one consumer category for which to classify the mobile user;

modifying the mobile user profile with the detected one or more pattern of usage, and the at least one consumer category;

generating an actionable event based, in part, on non-requested content that is selected based on the analysis, and the mobile user profile including the detected one or more patterns of usage over time and the at least one consumer category;

modifying the intercepted message by combing the actionable event with the intercepted message;

forwarding the modified message to the mobile device, wherein the mobile user is enabled to select the actionable event to receive non-requested content; and revising the mobile user profile if the actionable event is not selected.

16. The method of claim 15, wherein modifying the intercepted message further comprises replacing the contents of the intercepted message with at least a portion of the intercepted message and the actionable event.

17. The method of claim 15, wherein modifying the intercepted message further comprises replacing the contents of the intercepted message with a Uniform Resource Locator (URL) or a phone number to the contents of the intercepted message and the non-requested content.

18. The method of claim 15, wherein the source device is another mobile device, and the method further comprises:

intercepting a response message from the mobile device destined for the source device;

analyzing content of the intercepted response message;

determining another mobile user profile from characteristics of the source device, and from a tracked usage of the source device;

generating another actionable event based, in part, on the analysis of the response message, and the other mobile user profile;

modifying the intercepted response message by combing the other actionable event with the intercepted response message; and forwarding the modified response message to the source device, wherein the other actionable event enables access to the other non-requested content.

19. The method of claim 15, wherein the method is performed using program instructions operating within a computer.

20. A mobile device for use in receiving a message over a network, comprising:

a transceiver that is arranged to receive and to send messages over the network; and a processing component that is configured to execute data that enables actions, including:

receiving a Short Message Service (SMS) message, wherein the SMS message was intercepted from an originator and modified by the interceptor to insert an actionable event based on a tracked usage of the mobile device, a characteristic of the mobile device, and one or more detected patterns of usage of the mobile device over time that are detected based on an analysis of the tracked usage, at least one consumer category describing a mobile user of the mobile device based on analysis of the one or more detected patterns of usage; and Content of the intercepted SMS message;

displaying the SMS message including the actionable event;

enabling the mobile user of the mobile device to select the actionable event to receive non-requested content; and if the actionable event is not selected, providing information usable to update a mobile user profile for the mobile device.

21. The mobile device of claim 20, wherein the actionable event further comprises at least one of a text message, a graphic, an audio file, or a video file that is arranged to prompt an action over the network by the mobile user of the mobile device.

22. The mobile device of claim 20, wherein the actionable event further comprises a Uniform Resource Locator (URL) that is configured to launch a browser application within the mobile device to enable access to the non-requested content.

23. An apparatus for use in managing a communication over a network, comprising:

a transceiver that intercepts a message directed to a mobile device from a computing device;

means for analyzing a tracked usage of the mobile device over time to detect one or more patterns of usage of the mobile device over time;

means for analyzing the one or more patterns of usage to detect at least one consumer category that describes a mobile user of the mobile device;

means for determining a mobile user profile from characteristics of the mobile device, and from the tracked usage of the mobile device by the mobile user and further the detected one or more patterns of usage over time and the at least one consumer category; means for analyzing content of the intercepted message;

means for modifying the intercepted message with an actionable event based on the mobile user profile and the analyzed content;

means for forwarding the modified message to the mobile device, wherein the mobile user is enabled to select the actionable event to receive non-requested content; and means for revising the mobile user profile if it is detected that the actionable event is not selected.

* * * * *

UNITED STATES PATENT AND TRADEMARK OFFICE
CERTIFICATE OF CORRECTION

PATENT NO.         : 8,170,584 B2
APPLICATION NO.    : 11/422534
DATED              : May 1, 2012
INVENTOR(S)        : Ben Kim et al.

It is certified that error appears in the above-identified patent and that said Letters Patent is hereby corrected as shown below:

In column 18, line 33, in Claim 20, delete "Content" and insert -- content --, therefor.

Signed and Sealed this
Tenth Day of July, 2012

David J. Kappos
*Director of the United States Patent and Trademark Office*